United States Patent [19]

Chang

[11] Patent Number: 5,720,490
[45] Date of Patent: Feb. 24, 1998

[54] TRANSMISSION ASSEMBLY OF A BICYCLE

[76] Inventor: Wang-Lien Chang, 179, Long Ain St., San Hsia Chen, Taipei Hsien, Taiwan

[21] Appl. No.: 610,468

[22] Filed: Mar. 4, 1996

[51] Int. Cl.$^6$ .................................................. B62M 1/02
[52] U.S. Cl. ...................... 280/259; 280/260; 74/665 H; 74/416; 74/594.2
[58] Field of Search ............................... 280/259, 260, 280/261, 230, 212; 74/665 H, 416, 594.2

[56] References Cited

U.S. PATENT DOCUMENTS

| | | | |
|---|---|---|---|
| 4,895,385 | 1/1990 | Becoat | 280/261 |
| 5,184,838 | 2/1993 | Becoat | 280/259 |
| 5,397,142 | 3/1995 | Schwarzenbacher | 280/259 |

*Primary Examiner*—Paul N. Dickson
*Attorney, Agent, or Firm*—Peterson, Wicks, Nemer & Kamrath

[57] ABSTRACT

A transmission assembly has a front transmission device, a rear transmission device, and a soft shaft connected to the front and rear transmission devices. Each transmission device has a fixed disk, a driving disk, a transmission gear, a casing, a connector, a bearing, a cushion, and a retarder. The driving disk is positioned on the fixed disk by a plurality of rivets. A large number of square holes are formed on the driving disk. The square hole receives a gear tooth of the transmission gear. The transmission gear and the retarder are connected pivotally. The retarder and a connector are connected pivotally also. The retarder comprises at least two intermeshed retarding gears. The connector is connected to the soft shaft. The transmission device is enclosed by a casing.

4 Claims, 3 Drawing Sheets

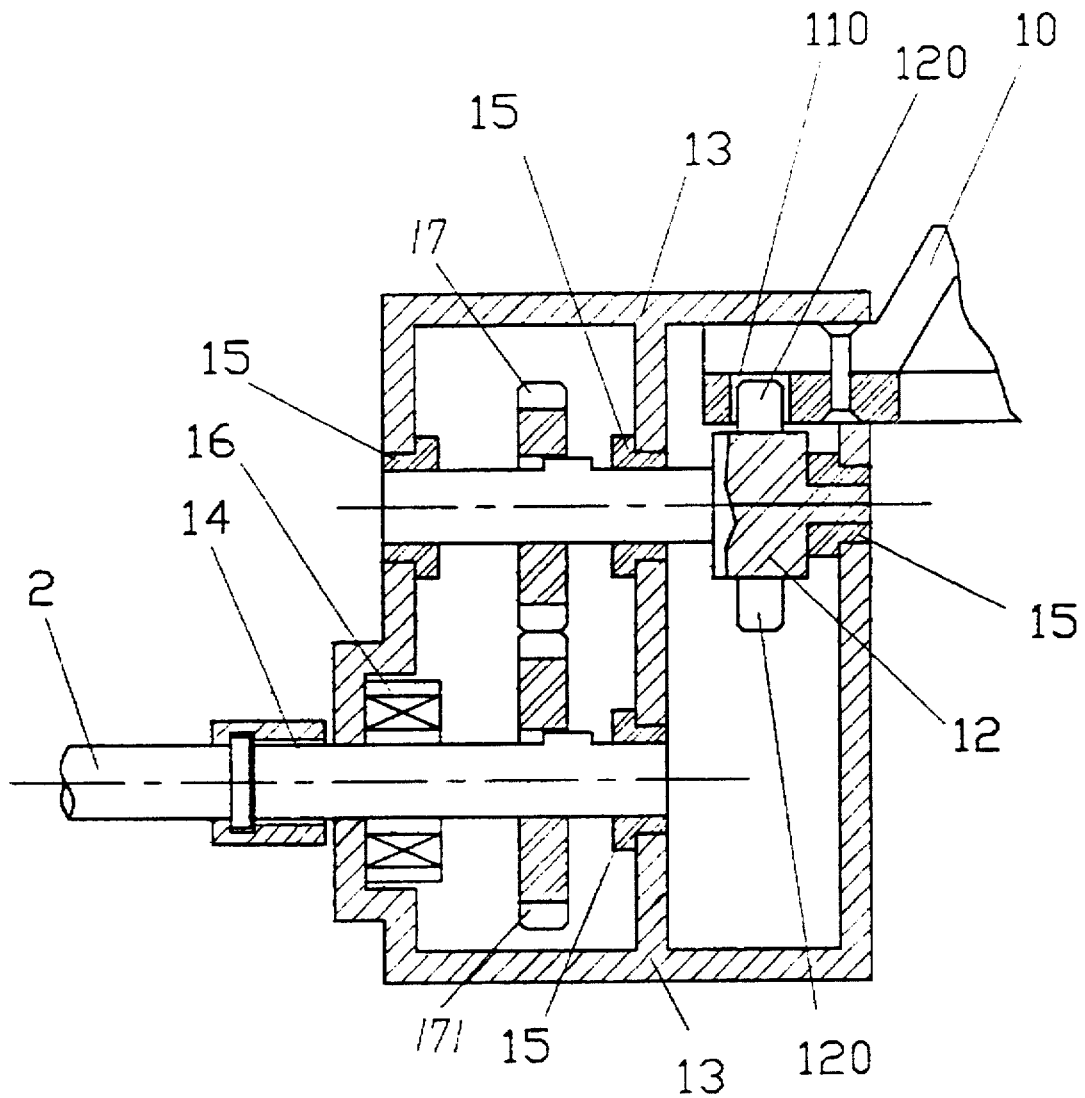
F I G. 3

TRANSMISSION ASSEMBLY OF A BICYCLE

BACKGROUND OF THE INVENTION

The invention relates to a transmission assembly of a bicycle. More particularly, the invention relates to two synchronous transmission devices for controlling a front wheel and a rear wheel simultaneously.

The front wheel and the rear wheel of a bicycle may have different speeds of rotation. The rider may be fallen down easily on a rough road. Since the front wheel and the rear wheel do not rotate at the same speed, the bicycle cannot move on a sandy road.

SUMMARY OF THE INVENTION

An object of the present invention is to provide a synchronous transmission assembly for controlling a front wheel and a rear wheel simultaneously.

Accordingly, a bicycle comprises a front wheel and a rear wheel. A transmission assembly comprises a front transmission device, a rear transmission device, and a soft shaft connected to the front transmission device and the rear transmission device. The front transmission device is disposed on the front wheel. The rear transmission device is disposed on the rear wheel. Each transmission device has a fixed disk, a driving disk, a transmission gear, a casing, a connector, a bearing, a cushion, and a retarder. The driving disk is positioned on the fixed disk by a plurality of rivets. A large number of square holes are formed on the driving disk. The square hole receives a gear tooth of the transmission gear. The transmission gear and the retarder are connected pivotally. The retarder and a connector are connected pivotally also. The retarder comprises at least two intermeshed retarding gears. The connector is connected to the soft shaft. The transmission device is enclosed by a casing. When the rear wheel is rotated, the fixed disk of the rear wheel will be rotated also. The driving disk of the rear wheel will rotate with the fixed disk simultaneously. The transmission of power will be transmitted from the driving disk of the rear wheel to the transmission gear of the rear wheel, to the retarder of the rear wheel, to the connector of the rear wheel, to the soft shaft, to the connector of the front wheel, to the retarder of the front wheel, to the transmission gear of the front wheel, to the driving disk of the front wheel, and then to the front wheel. Thus the front wheel and the rear wheel will rotate simultaneously.

BRIEF DESCRIPTION OF THE DRAWINGS

FIG. 3 is a partially cross-sectional view of a transmission device of a preferred embodiment in accordance with the invention.

DETAILED DESCRIPTION OF THE INVENTION

Figure 1:
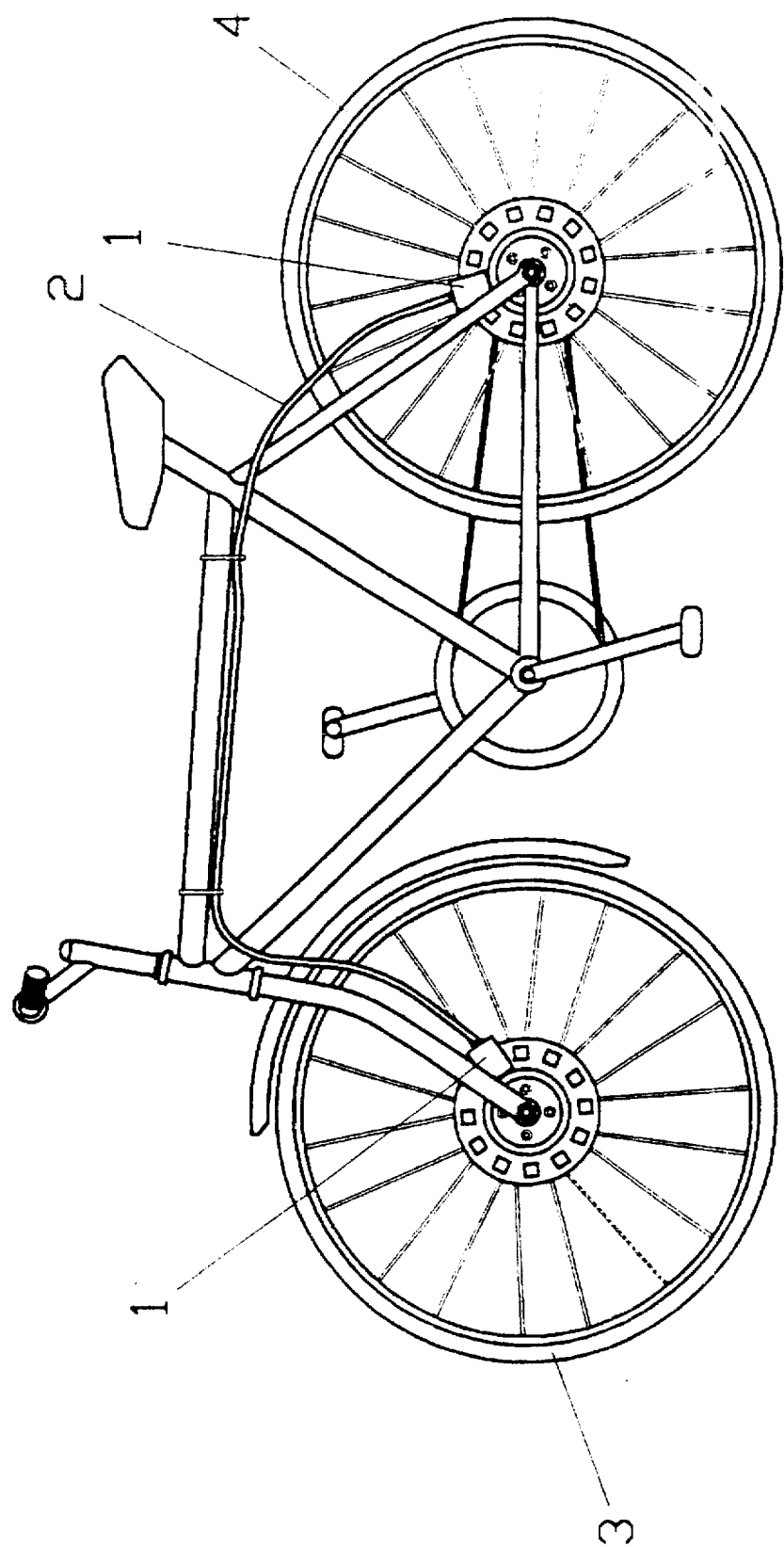
FIG. 1 is an elevational view of a bicycle with a transmission assembly of a preferred embodiment in accordance with the invention.

Referring to FIG. 1, a bicycle has a front wheel 3 and a rear wheel 4. A transmission assembly comprises a front transmission device 1, a rear transmission device 1, and a soft shaft 2 connected to the front transmission device 1 and the rear transmission device 1. The front transmission device 1 is disposed on the front wheel 3. The rear transmission device 1 is disposed on the rear wheel 4.

Figure 2:
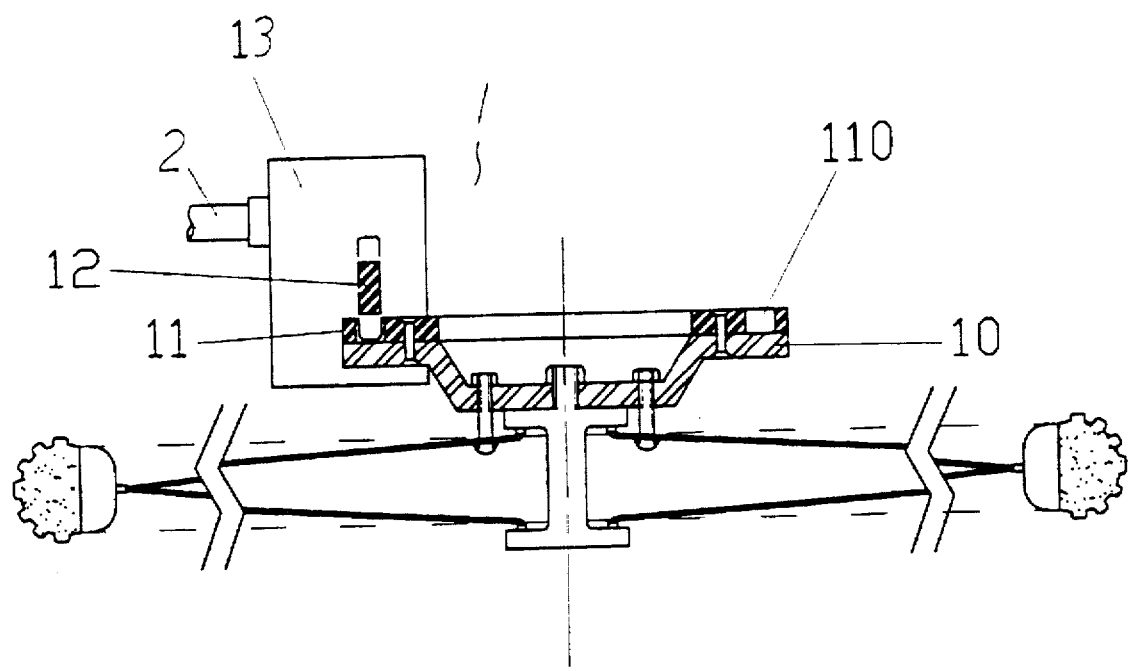
FIG. 2 is a partially cross-sectional view of a fixed disk and a driving disk.
Figure 2A:
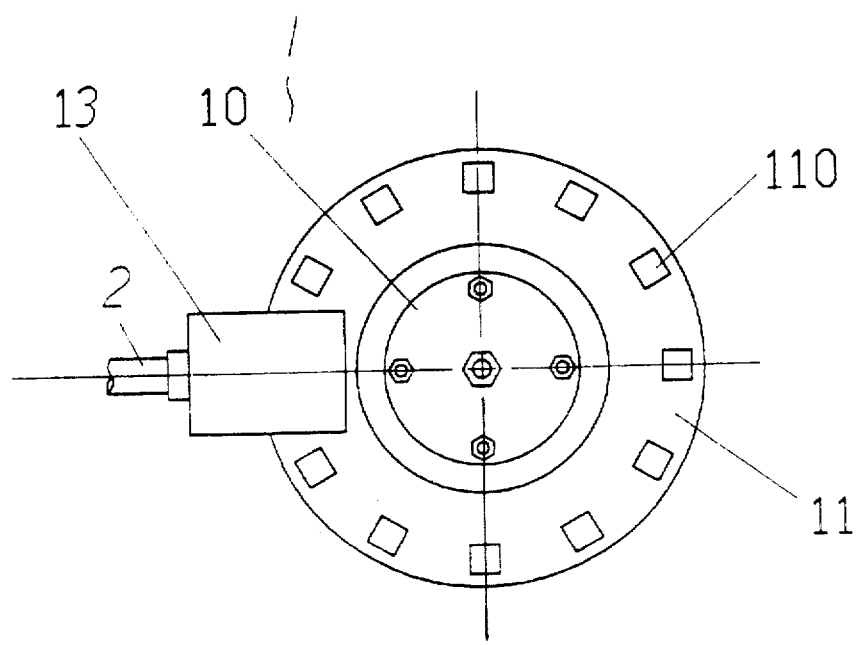
FIG. 2A is an elevational view of a fixed disk a driving disk, and a casing.

Referring to FIGS. 2, 2A and 3, each transmission device 1 has a fixed disk 10, a driving disk 11, a transmission gear 12, a casing 13, a connector 14, a bearing 15, a cushion 16, and a retarder 17. The driving disk 11 is positioned on the fixed disk 10 by a plurality of rivets. A large number of square holes 110 are formed on the driving disk 11. The square hole 110 receives a gear tooth 120 of the transmission gear 12. The transmission gear 12 and the retarder 17 are connected pivotally. The retarder 17 and a connector 14 are connected pivotally also. The retarder 17 comprises at least two intermeshed retarding gears 171. The connector 14 is connected to the soft shaft 2. The transmission device 1 is enclosed by a casing 13. When the rear wheel 4 is rotated, the fixed disk 10 of the rear wheel 4 will be rotated also. The driving disk 11 of the rear wheel 4 will rotate with the fixed disk 10 simultaneously. The transmission of power will be transmitted from the driving disk 11 of the rear wheel 4 the transmission gear 12 of the rear wheel 4, to the retarder 17 of the rear wheel 4, to the connector 14 of the rear wheel 4, to the soft shaft 2, to the connector 14 of the front wheel 3, to the retarder 17 of the front wheel 3, to the transmission gear 12 of the front wheel 3, to the driving disk 11 of the front wheel 3, and then to the front wheel 3. Thus the front wheel 3 and the rear wheel 4 will rotate simultaneously.

The invention is not limited to the above embodiment but various modification thereof may be made. Further, various changes in form and detail may be made without departing from the scope of the invention.

I claim:
1. A transmission assembly comprising:
   a front transmission device, a rear transmission device, and a soft shaft connected to said front transmission device and said rear transmission device;
   each said transmission device having a fixed disk, a driving disk, a transmission gear, a connector, a bearing, a cushion, and a retarder;
   said driving disk positioned on said fixed disk by a plurality of rivets;
   a number of square holes formed on said driving disk;
   said square holes receiving a gear tooth of said transmission gear;
   said transmission gear and said retarder connected pivotally;
   said retarder and a connector connected pivotally;
   said retarder comprising at least two intermeshed retarding gears; and
   said connector connected to said soft shaft.
2. A transmission assembly as claimed in claim 1, wherein said front transmission device is enclosed by a casing.
3. A transmission assembly as claimed in claim 1, wherein said rear transmission device is enclosed by a casing.
4. A transmission assembly as claimed in claim 1, wherein said retarder has three intermeshed gears.

* * * * *